United States Patent [19]

Hirose

[11] Patent Number: 4,825,836

[45] Date of Patent: May 2, 1989

[54] INTERNAL COMBUSTION ENGINE WITH TURBO-CHARGER AND KNOCKING CONTROL SYSTEM

[75] Inventor: Kiyoo Hirose, Toyota, Japan

[73] Assignee: Toyota Jidosha Kabushiki Kaisha, Toyota, Japan

[21] Appl. No.: 124,762

[22] Filed: Nov. 23, 1987

[30] Foreign Application Priority Data

Nov. 28, 1986 [JP]  Japan ................................ 61-285312
Nov. 28, 1986 [JP]  Japan ................................ 61-285313

[51] Int. Cl.$^4$ ............................................. F02D 43/00
[52] U.S. Cl. .................................... 123/478; 123/421; 123/425; 123/435
[58] Field of Search ............... 123/425, 435, 478, 480, 123/492, 421, 489

[56] References Cited

U.S. PATENT DOCUMENTS 4,711,200  12/1987  Kinoshita ............................ 123/492
4,727,841   3/1988  Hirose et al. ........................ 123/425

FOREIGN PATENT DOCUMENTS 58-28567  2/1983  Japan .................................. 123/489
58-51242  3/1983  Japan .................................. 123/435
58-51241  3/1983  Japan .
60-53645  3/1985  Japan .
61-53431  3/1986  Japan .
62-48944  3/1987  Japan .
62-87635  4/1987  Japan .

Primary Examiner—Andrew M. Dolinar
Attorney, Agent, or Firm—Cushman, Darby & Cushman

[57] ABSTRACT

A fuel injection system for an internal combustion engine provided with a turbo-charger and an ignition retard control system responsive to a signal from knocking sensor for controlling knocking. A system is provided for attaining a fuel enrichment correction at a predetermined range of engine conditions for preventing an increase in a temperature of the exhaust gas. The enrichment is delayed for a predetermined period after moving into that range, to obtain a high fuel economy. A system is further provided for cancelling the enrichment delay when the engine is under a particular condition where the exhaust gas temperature is very apt to be increased. Such a condition is detected by an enrichment correction value or ignition retard correction value which is larger than a threshold value.

8 Claims, 13 Drawing Sheets

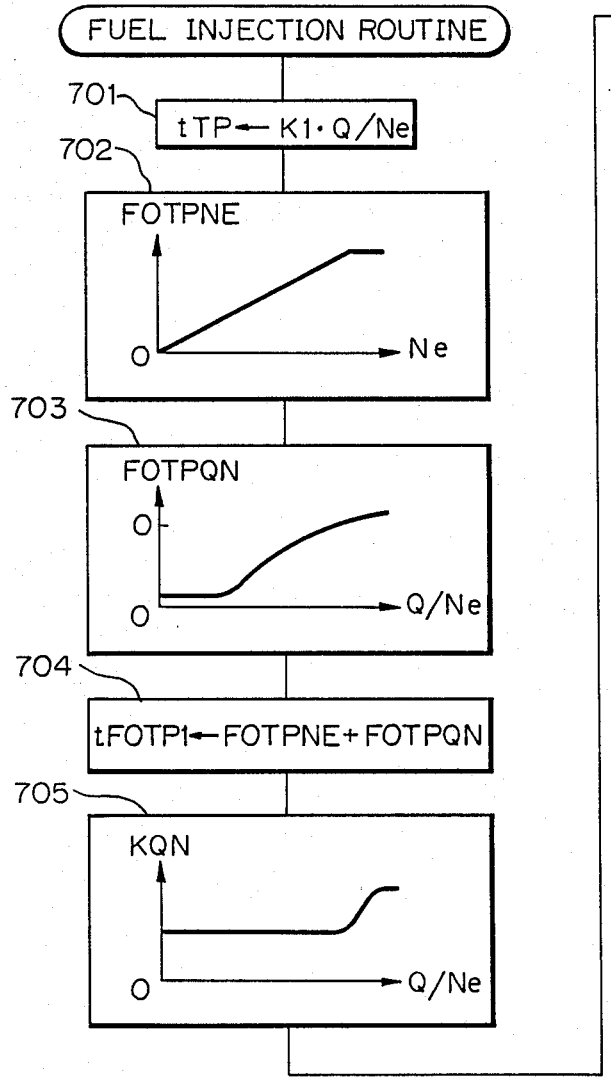

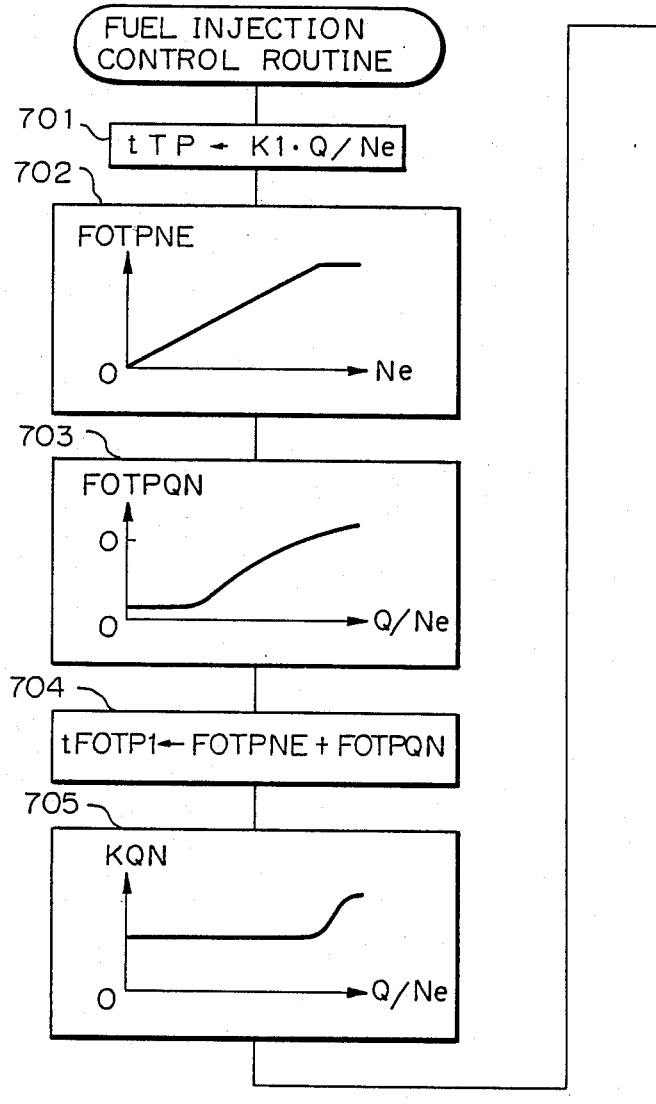

INTERNAL COMBUSTION ENGINE WITH TURBO-CHARGER AND KNOCKING CONTROL SYSTEM

BACKGROUND OF THE INVENTION

1. Field of the Invention

The present invention relates to an internal combustion engine provided with a turbo-charger and a knocking control system. More particularly, it relates to a system capable of preventing an increase in the temperature of the exhaust gas.

2. Description of the Related Art

The temperature of the exhaust gas is determined by various engine operating conditions, such as the engine speed, load, and ignition timing. In particular, the exhaust gas temperature becomes extremely high when the engine speed or load is high. The temperature of the exhaust gas reaches a maximum value when the value of the air-fuel ratio of a combustible mixture is slightly higher than the theoretical air-fuel ratio when the engine speed, load and ignition timing values are constant. As the air-fuel ratio becomes lower than said value, i.e., the combustible mixture becomes richer, the temperature of the exhaust gas is further reduced.

When the temperature of the exhaust gas is increased, the catalytic converter is prematurely damaged. Therefore, a system has been proposed for realizing an enrichment correction of an injected fuel amount so that the air-fuel ratio is smaller than the theoretical air-fuel ratio (rich air-fuel mixture) when the engine is operated under a high engine speed or load condition. This fuel enrichment correction, however, causes a decrease in the fuel consumption efficiency, and further, the exhaust gas reaches a high temperature very shortly after the engine has entered the high speed or load condition. Therefore, usually an enrichment correction is not made until after a certain delay time has elapsed.

The delay time can be determined in accordance with the engine speed and load, as disclosed in Japanese Unexamined Patent Publication No. 58-51241. Alternatively, the delay time can be determined in accordance with the rate of change in the load increase, as disclosed in Japanese Unexamined Patent Publication No. 60-53645. The delay time also may be determined in accordance with the temperature of the cooling water of the engine.

The above mentioned solutions are sufficient for a conventional type of internal combustion engine, but when the engine is provided with a turbo-charger and a knocking control system using an ignition retard control, the prior art methods cannot effectively control the increase in the exhaust gas temperature.

SUMMARY OF THE INVENTION

An object of the present invention is to provide an internal combustion engine capable of overcoming the above mentioned difficulty.

According to the present invention, an internal combustion engine is provided, which comprises:
an engine body;
an intake line for introducing air into the engine body;
an exhaust line for removing exhaust gas from the engine body;
means for supplying an amount of fuel into the engine so as to provide an air-fuel mixture;
means for calculating the amount of fuel to be supplied, from the supply means to the engine, which is determined in accordance with the basic engine operating conditions including an engine speed and load;
means for modifying the basic amount by incorporating an enrichment correction value of the basic amount when the engine conditions are such that the temperature of the exhaust gas is increased;
delay means for delaying said modification for a predetermined period after the enrichment is required within a time range where the increase in the temperature of the exhaust gas is small;
detecting means for detecting a particular condition of the engine where the temperature of the exhaust gas is greatly increased when the enrichment is delayed, and;
means for cancelling the operation of the delay means when the engine is in a particular condition.

BRIEF DESCRIPTION OF THE DRAWINGS

FIGS. 2 to 5(b) are flowcharts illustrating the routines attained by the control circuit in FIG. 1.

FIGS. 11, 11(a) and 11(b) are a flowchart of a fuel injection routine in the second embodiment of the present invention.

DESCRIPTION OF THE PREFERRED EMBODIMENTS

Figure 1:
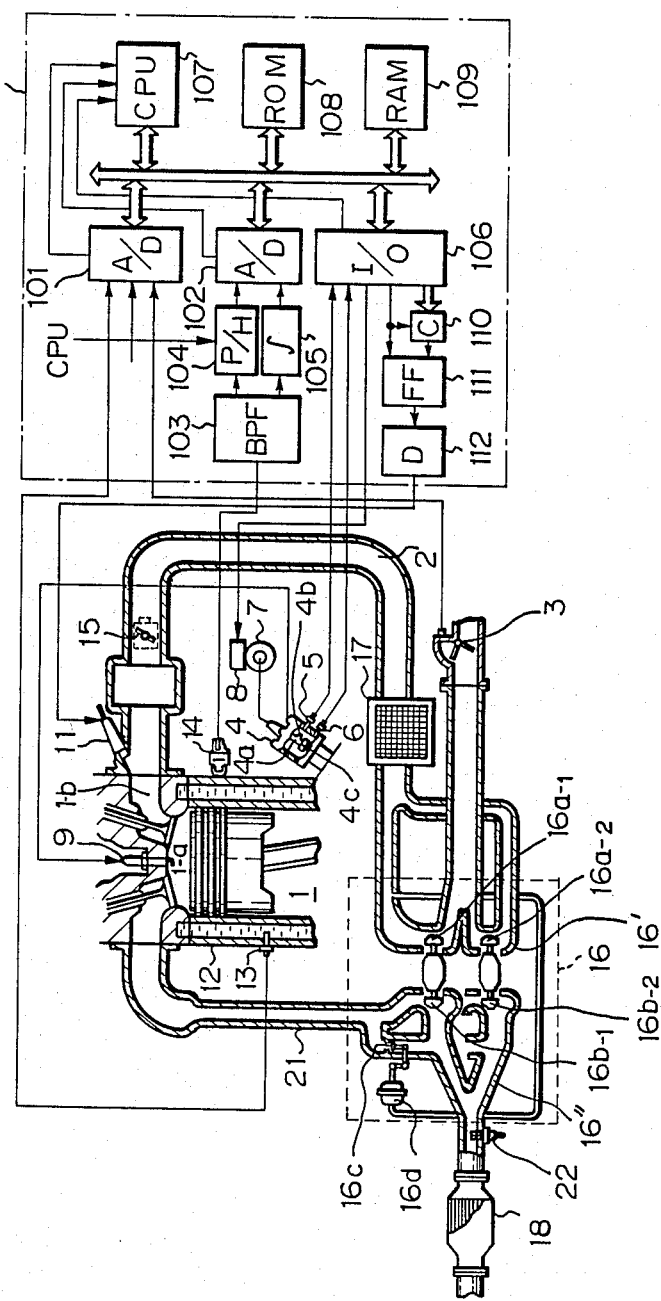
FIG. 1 is an entire system view of an internal combustion engine according to the present invention.

The present invention will be described with reference to embodiments to be applied to an electronic fuel injection internal combustion engine provided with a turbo-charger. FIG. 1 shows an entire system of the internal combustion engine together with an electronic control system and other related devices. The internal combustion engine 1 is provided with an intake line 2 to which an air flow meter 3 is connected. The air flow meter 3 directly measures the amount of air Q introduced into the engine and is provided with a potentiometer (not shown) issuing an analog signal indicating a level proportional to the amount of intake air. The output signal from the air flow meter is supplied to an A-D converter 101 which is incorporated with a multiplexer for attaining a sequential analog-to-digital transformation from the plurality of analog sensors. Reference numeral 4 denotes a distributor having a distributing shaft 4a to which magnet members 4b and 4c are connected. First and second crank angle sensors 5 and 6 are Hall elements and are mounted on a housing of the distributor in such a manner that the sensors 5 and 6 cooperate with the magnet members 4b and 4c, respectively. The first sensor 5 cooperates with the magnet member 4b so that a pulse signal is generated for every 720 degrees rotation of the crankshaft. The second sensor 6 cooperates with the magnet member 4c so that a pulse signal is generated for every 30 degrees rotation of the crankshaft. The crank angle sensors 5 and 6 are connected to an output and input interface circuit 106 of the control circuit 10. Note, the signal from the second crank angle sensor 6 can be introduced to an interruption port of a central processing unit (CPU) 107.

Reference numeral 7 denotes an ignition coil unit having a primary coil which is connected to an ignitor 8 and a secondary coil connected to respective spark plugs 9 of the cylinders via the distributor 4. The electric current in the primary coil of the ignition coil 7 is generated by the commencement of the supply to the ignitor 8. The ignitor 8 is de-energized after the lapse of a predetermined time. At this instant, an electric current having a high voltage is generated in the secondary coil of the ignition coil, and thus a spark is generated at the spark plug 9, allowing the ignition process to take place. Note, the control circuit 10 controls the energization of the ignitor 8.

The intake line 2 is provided with branch pipes extending to the respective cylinders, on which branch pipe injectors 11 are connected, respectively, for introducing pressurized fuel to the respective intake ports 1-b of the cylinders.

A temperature sensor 13 is arranged in a water jacket 12 formed in a cylinder block of the engine 1, to detect the temperature of the cooling water in the water jacket 12. The temperature sensor 13 issues an analog signal corresponding to the temperature THW of the cooling water. This analog signal is also supplied to the A-D converter 101. Furthermore, a vibration detector type knocking sensor 14 is connected to the cylinder block of the engine 1 for issuing an analog signal indicating mechanical vibration of the engine body 1, to detect a knocking condition of the engine.

The knocking sensor 14 is connected to a band-pass filter 103 of the control circuit 10. The band-pass filter 103 selectively passes only a portion of frequency area of the signal from the knocking sensor 14 corresponding to the knocking frequency area. The band-pass filter 103 is connected to a peak hold circuit 104 as well as the integral circuit 105. The peak hold circuit 104 memorizes the maximum value a in the output signal from the band-pass filter 103 in a predetermined period of a cycle of the engine. The integral circuit 105 obtains a mean value b (background level) of the output signal from the band-pass filter 103. It is considered that knocking is generated when the following equation is satisfied, $$a > k \times b,$$

where k is a constant. This equation shows that it is considered that knocking has occurred when the maximum level a is larger than k times the background level b. The background level b as the reference value for determining the generation of knocking has optimum values which change in accordance with the engine speed Ne. The peak hold circuit 104 and the integral circuit 105 are connected at their outputs to the A-D converter 102 incorporated with the multiplexer.

A turbo-charger 16 is a twin turbo type having a set of compressor wheels 16a-1 and 16a-2 arranged in parallel in a compressor housing 16' connected to the intake line 2 and a set of turbine wheels 16b-1 and 16b-2 arranged in parallel in the turbine housing 16'' connected to the exhaust line 21. A waist gate valve 16c operated by a vacuum actuator 16d is arranged so as to allow a by-pass of the turbine wheels 16b-1 and 16b-2. A flow of the exhaust gas from the exhaust line 21 rotates the turbine 16b-1 and 16b-2, causing the compressor wheels 16a-1 and 16a-2 to rotate to effect supercharging. The exhaust gas iron the turbine 16b-1 and 16b-2 is exhausted to the atmosphere via a catalytic converter 18.

An air-fuel ratio sensor 22 is arranged in the exhaust line between the turbo-charger 16 and the catalytic converter 18, to detect the air-fuel ratio as a concentration of oxygen in the exhaust gas.

The control circuit 10 is essentially comprised of a central processing unit 107 and the previously mentioned units, together with a read only memory (ROM) 108, random access memory (RAM) 109, down counter (C) 110, flip-flop circuit (FF) 111, and drive circuit (D) 112. Among these elements, the down counter 110, flip-flop circuit 111, and drive circuit 112 operate the injectors 11. An injection fuel amount TAU is calculated by a routine described later, and is set to the down counter 110. At the same time, the flip-flop is set to allow a fuel injector 11 to commence the fuel injection. The down counter 110 counts the clock pulses, and on completion of the count down, the down counter 111 issues, at the carry out terminal thereof, a "1" signal, allowing the flip-flop 111 to be reset. As a result, the drive circuit 112 causes the fuel injection operation of the injector 11 to be stopped. As will be appreciated, the injector 11 injects the calculated amount of fuel, TAU, and therefore, the calculated amount of fuel TAU is supplied to the engine combustion chamber 1-a-a.

It should be noted that an interruption routine by the CPU 107 is commenced, for example, when the analog-to-digital conversion by the A-D converter 101 or 102 is completed, or the 30 degree crank angle pulse from the second crank angle sensor 6 is received by the input-output interface 106.

The data of the intake air amount Q from the air flow meter 3 and data of the cooling water temperature THW are input and stored in a predetermined area of the RAM 109 by an analog-to-digital conversion routine executed at a predetermined constant time interval. In other words, data of the intake air amount Q and the cooling water temperature THW is updated for said predetermined period. Furthermore, the engine speed Ne is calculated at an interruption routine occurring at every 30 degrees crank angle from the consecutive 30 degrees crank angle pulse signals, and is stored in a predetermined area of the RAM 109.

Figure 2:
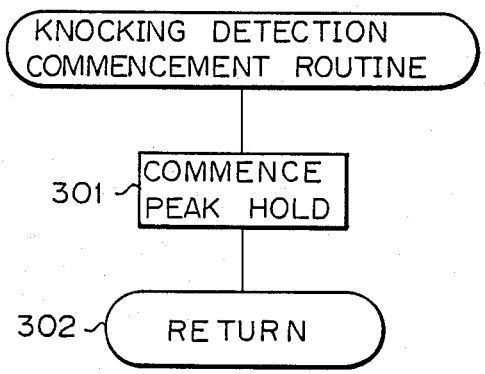

Now the operation of the control circuit 10 will be described with reference to the flowcharts in FIGS. 2 to 5. FIG. 2 is a routine for capturing the peak level in the signal from the knocking sensor 14. This routine is executed at a predetermined crank angle timing, for example, 60 degrees before top dead center of each cylinder in the compression stroke. This timing is selected so that a peak level occurring in the subsequent combustion stroke can be correctly detected, and can be found from a counter for counting a number of 30 degrees crank angle pulses from the second crank angle sensor 6 after a reference 720 degrees crank angle pulse from the first crank angle sensor 5 has been issued. A distance between the consecutive timings of this routine in the case of a four cylinder engine is, of course, a 180 degrees crank angle, to allow a detection of knocking in each cylinder. At block 301, a signal is issued to the peak hold circuit 104 to commence operation thereof. As well known to those skilled in this art, the peak hold circuit 104 constantly updates the maximum level in the signal from the knocking sensor 14. This interruption routine is completed at block 302.

Figure 3:
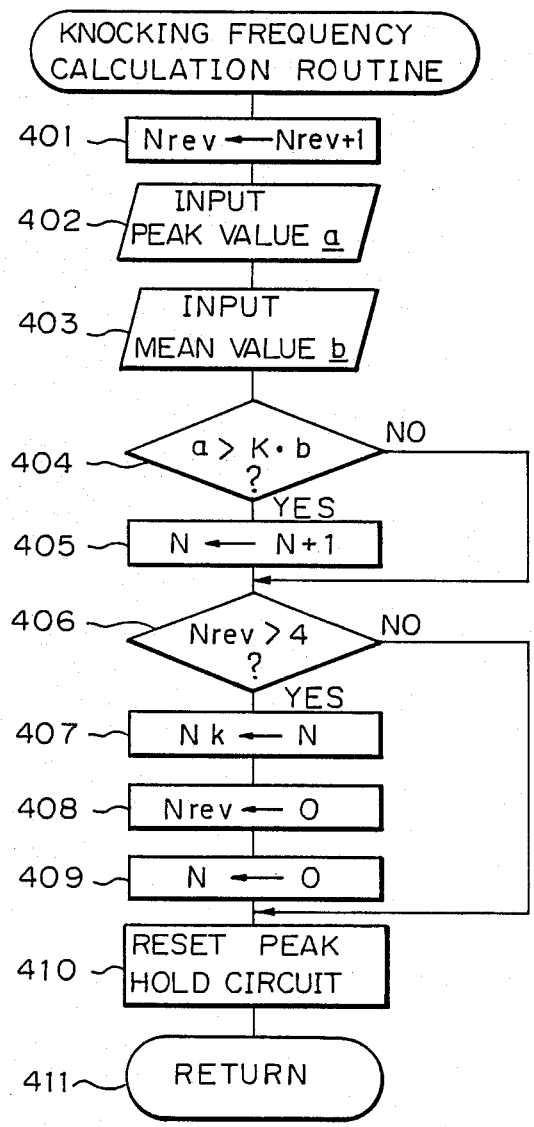

FIG. 3 is a routine for calculating a number of knocks per unit period. This routine is executed at a predetermined timing after top dead center in the compression stroke, for example, 60 degrees ATDC. This timing is selected so that the peak to be detected appears at a timing sufficiently before 60 degrees ATDC, to obtain the value of the peak, and can be found from a counter for counting a number of 30 degrees crank angle pulses from the second crank angle sensor 6 after a reference 720 degrees crank angle pulse from the first crank angle sensor 5 has been issued.

At block 401, a counter Nrev for counting a predetermined number of rotations, for example, 2 rotations (720 degrees crank angle) is incremented. The counter Nrev is incremented for every 180 degrees crank angle, since the routine of FIG. 3 is carried out at every 180 degrees. This means that the value of the counter Nrev is increased by four when the crankshaft attains two rotations corresponding to a 720 degrees crank angle. At block 402, the peak value a in the knocking sensor signal 14 from the peak hold circuit 104, which is analog-to-digital converted, is input. At block 403, a background level (mean value) b in the averaged knocking sensor signal from the integral circuit 105, which is analog-to-digital converted, is input. At block 404, it is determined whether the equation, $a > k \times b$, where k is constant, is satisfied. When this equation is satisfied, it is considered that the engine is in a knocking condition. Thus, the routine goes to block 405 where a knocking counter N is incremented by 1. When the equation is not satisfied, i.e., $a < k \times b$, block 405 is by-passed.

At block 406, it is determined if the counter Nrev is larger than 4, i.e., two rotations of the crankshaft are just completed after the value of the counter Nrev was previously reset to commence this period for measuring knocking. When the result at block 406 is "Yes", it is considered that this knocking measuring period is completed, and therefore, the routine goes to block 407 where the value of the counter N is moved to the area of the RAM 109 for counting the number of knocks Nk per two engine rotations. The counter Nrev for counting 2 engine rotations and the counter N for counting a number of knocks per 2 engine rotations are reset at blocks 408 and 409, respectively, to commence a new period for detection of the number Nk of knocks per 2 engine rotations.

At block 410, a signal is issued to reset the peak hold circuit 104. This reset is carried out after the completion of a detection of a peak level obtained at the present combustion stroke of one cylinder.

Figure 4:
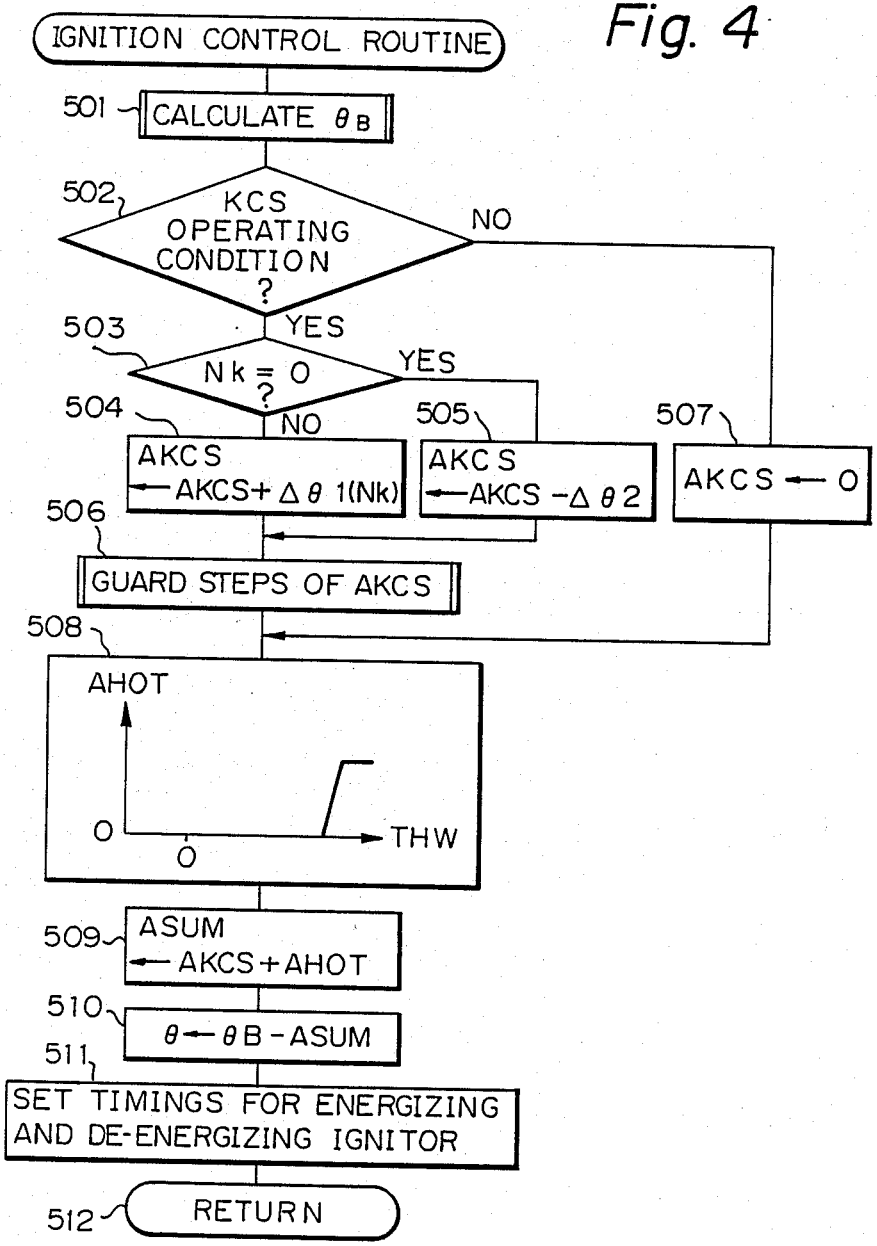

FIG. 4 is a routine for attaining an ignition control. This routine is effected at a predetermined timing before a timing for issuing an ignition signal. This routine is, in the case of a four cylinder engine, carried out at every 180 degrees crank angle. At block 501, a basic value of the ignition timing $\theta_B$ is calculated. As well known, the ROM 108 is provided with a map comprising data of a basic ignition timing in relation to combinations of values of a ratio of an intake air amount Q to an engine speed Ne and values of the engine speed Ne. A well known interpolation calculation is effected from the Q/Ne-Ne map in order to obtain a value of a basic ignition timing $\theta_B$ corresponding to a combination of the values of Q/Ne and Ne. At block 502, it is determined if the engine is in a condition where the knocking feedback control system (KCS) is to be operated for a feedback control of the ignition timing so that the generation of knocking is suppressed. This condition is satisfied, for example, when the temperature of the cooling water of the engine THW is higher than 60 degrees centigrade. When the cooling water temperature is lower than 60 degrees centigrade, because the engine is cold, clearances between respective parts of the engine become large, so that engine vibration (noise) for a reason other than knocking becomes larger. This makes a detection of knocking difficult or causes the knocking feedback control to malfunction. Therefore, the knocking feedback control is cancelled when the engine is cold. In other words, the routine goes from block 502 to block 507, where a value of zero is moved to a RAM area for storing the retard correction amount AKCS in the ignition timing.

When the engine is in a knocking feedback condition, i.e., the engine has warmed up, the routine goes from block 502 to block 503 to 506, to attain the knocking feedback control. At block 503 it is determined if the value of the knocking counter Nk is "0". If the value of the counter Nk is other than zero, this means that knocking has taken place at the preceding combustion stroke. In the internal combustion engine provided with a turbo-charger, such as in the embodiment shown in FIG. 1, knocking is easily generated when, for example, a gasoline having a low octane number is used. A frequent generation of knocking soon causes damage to the engine. If it is considered that the engine is experiencing knocking, the routine goes from block 503 to block 504, where an ignition timing retard control in accordance with the knocking frequency Nk is effected. In this embodiment, a knocking retard correction value AKCS is incremented by $\Delta\theta_1$ (Nk), which is a function of the knock number Nk. In other words, this retard value $\Delta\theta_1$ is determined so that it increases as the knock number increases, so that the ignition timing is retarded in accordance with the degree of knocking.

When it is determined that there is no knocking, the routine goes from block 503 to block 505, where the ignition timing is advanced. In this embodiment, in order to advance the ignition timing, the retard correction value AKCS is decremented by $\Delta\theta_2$. It should be noted that the value of $\Delta\theta_2$ may be fixed or varied in accordance with the time lapsed. At the following block 506, a guard routine is carried out to maintain the retard correction value AKCS in a range between the minimum value (0) and the maximum value AKCSMAX. This block includes a step of determining whether AKCS is smaller than zero, and step of moving a zero value to AKCS when AKCS is smaller than 0, to prevent an advance of the ignition timing further than the basic timing $\theta_{BASE}$. The block further includes a step of determining whether AKCS is larger than AKCSMAX, and a step of moving AKCSMAX to AKCS when AKCS is larger than AKCSMAX. This means that the ignition timing cannot be retarded further than AKCSMAX from $\theta_{BASE}$. The value of AKCSMAX is set so that it varies in accordance with a combination of values of Q/Ne and Ne. A map comprising data of the values of AKCSMAX with respect to combinations of the values of Q/Ne and Ne is provided in the ROM 108, and a map interpolation, as well known, is carried out to calculate a value of AKCSMAX corresponding to a combination of the detected Q/Ne and Ne value. It should be noted that the value of AKCS is stored in the RAM 109.

Figure 6:
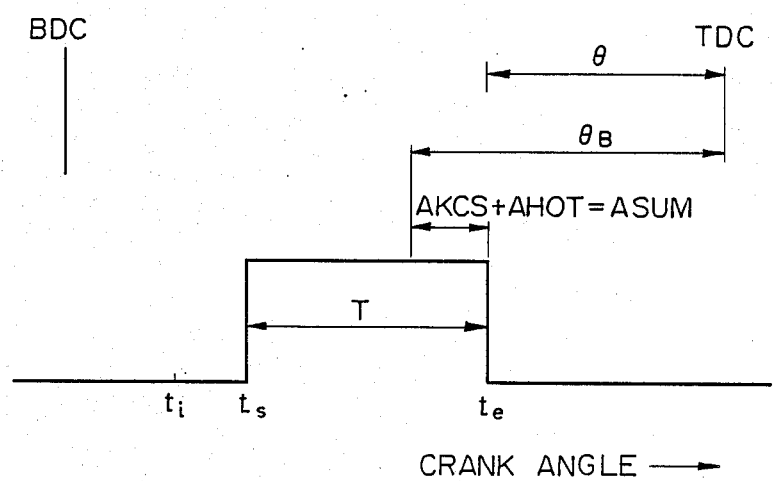
FIG. 6 is a timing chart illustrating an ignition operation.

At block 508, a data of the cooling water temperature THW is read out from the RAM 109, and a high temperature retard correction amount AHOT is calculated from a map. This correction is made to retard the ignition timing when the engine has attained an extremely high temperature, such as 100 degrees centigrade, in order to forcibly decrease the engine output power and thus decrease the engine temperature, and to prevent a frequent generation of knocking. The ROM 108 is provided with a one-dimensional map comprising data of the temperature retard correction value AHOT with respect to the values of engine cooling water THW. A known map interpolation calculation is carried out to obtain a value of AHOT corresponding to the detected value of THW. Note, the calculated value of AHOT is temporarily stored in the RAM 109. At block 509, a total retard correction amount ASUM is calculated as a sum of the knocking correction amount AKCS and the engine high temperature correction amount AHOT. At block 510, a final ignition timing $\theta$ is calculated as the basic ignition timing $\theta_B$ minus the total retard correction amount ASUM. At block 511, a calculation of a timing of an energization of the ignitor 8, $t_s$, and a calculation of a timing of a de-energization of the ignitor 8, $t_e$, are carried out in a way well known to those skilled in this art. In FIG. 6, $t_i$ is designated as the timing at which the present routine of 30 degrees crank angle is carried out, and T is a duration period which is necessary for energizing the ignitor 8 to obtain a high voltage in the ignition coil 7 and allow ignition. The final ignition timing $\theta$, as the basic ignition timing $\theta_B$ minus the total retard correction ASUM, which is equal to a sum of the knocking correction AKCS and the temperature correction AHOT, corresponds to the timing $t_e$. These timings $t_i$ and $t_e$ are set to the respective counters or to a compare register in the case of a free run counter control type. At the timing $t_i$, the ignitor 8 is energized. The ignitor 8 is de-energized at the timing $t_e$ so that a high voltage is generated in the ignition coil 7 to obtain ignition. This interruption routine is ended at block 512 in FIG. 4.

It should be noted that the routine in FIG. 3 detects a knocking having a level which is larger than a single threshold value ($k \times b$). But it is possible to provide three stage threshold values. Namely, knocking at a level larger than the largest threshold value is called large knocking; knocking at a level smaller than the maximum threshold and larger than medium threshold level is called medium knocking; and, knocking at a level smaller than the medium threshold value and larger than the lowest level is called small knocking. The knocking frequency is calculated for each of the large, medium and small knocking levels. In this case, the value of the retard amount $\Delta\theta_1$ at block 504 in FIG. 4 is varied in accordance with the type of knocking. For example, when a medium or large knocking level is detected, the value of the retard amount $\Delta\theta_1$ will be two or three times the value of the retard amount $\Delta\theta_1$ when the small knocking level is detected.

Figure 5B:
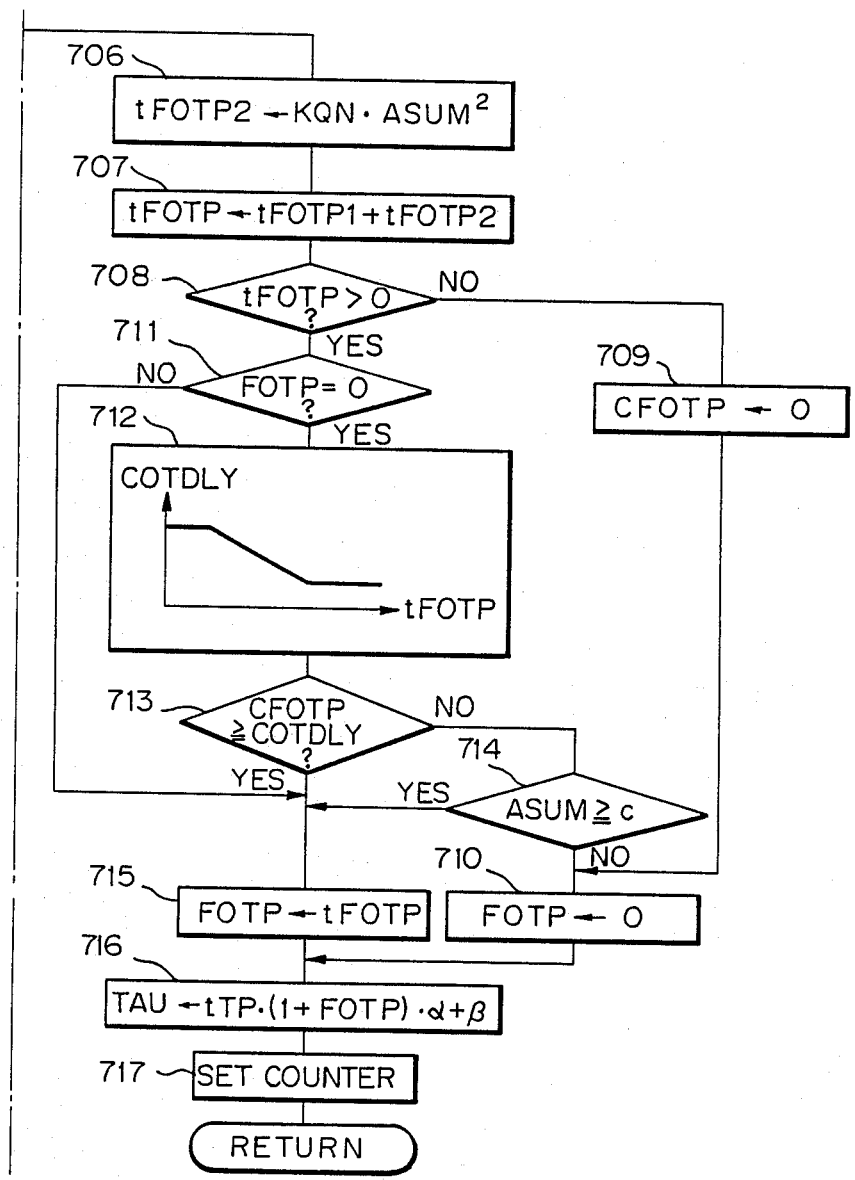

FIG. 5 shows a flowchart for calculating an amount of fuel to be injected. This routine is executed at a crank angle interval of a predetermined value, such as 360 degrees corresponding to one rotation of the crankshaft of the engine. At block 701, the data of an intake air amount Q and engine speed Ne is read out from the RAM 109 and the basic amount of fuel to be injected, tTP is calculated by $K_1 \times (Q/Ne)$, where $K_1$ is constant.

At blocks 702 to 704, a first enrichment correction amount tFOTP$_1$ is calculated. This first correction amount prevents the temperature of the exhaust gas from rising when the engine speed or engine load is increased. At block 702, a value of FOTPNE, which is a contribution of the engine speed Ne to the first correction amount, is calculated by a one-dimensional interpolation from a map. This map comprises data of the values of FTOPNE and engine speed Ne. An interpolation is carried out to obtain a value of FOTPNE corresponding to the detected engine speed.

At block 703, a ratio of the intake air amount to the detected engine speed is obtained, Q/Ne is calculated, and a map calculation of a value of FOPPQN is executed, which is a contribution of the engine load to the first correction amount. A map is provided, which comprises data of the values of FTOPQN to the values of Q/Ne. An interpolation is carried out to obtain a value of FTOPQN corresponding to the calculated Q/Ne.

At block 704, FTOPNE and FTOPQN are summed to obtain a first enrichment correction amount tFTOP$_1$.

At blocks 705 and 706, a second enrichment correction amount fFOTP2 is calculated b a map interpolation. This correction amount is used to prevent a rise in the temperature of the exhaust gas when the ignition timing is retarded. A one-dimensional map is provided, which is comprised of data of the values of a correction factor KQN with respect to the values of a ratio of intake air amount to the engine speed, Q/Ne. At block 705, interpolation is carried out to obtain a value of KQN corresponding to the value of Q/Ne as calculated. At block 706, a data of the total retard amount ASUM (see step 509 in FIG. 4) is calculated by $KQN \times (ASUM)^2$. This means that the second enrichment correction amount fFOTP$_2$ is calculated as a second order function of the amount by which the ignition timing is retarded.

At block 707, a total enrichment tFOTP is calculated as a sum of the first enrichment correction value fFOTP$_1$ determined by the engine speed and load, and the second enrichment value fFOTP$_2$ determined by the ignition retard amount.

At block 708, it is determined if the value of fFOTP calculated at block 707 is larger than zero. If it is determined that fFOTP is not larger than zero, there is no necessity for fuel enrichment. Then the routine goes from block 708 to block 709, where a rich counter CFOTP is cleared. This counter CFOTP automatically counts up at every small period. The counter CFOTP, as will be explained later, counts a duration of the enrichment operation. Then, the routine goes to block 710 where a memory area for storing the data of the value of the enrichment correction as executed, FOTP, is cleared, and therefore, an enrichment correction is not carried out.

If it is determined that fFOTP is larger than zero, fuel enrichment is necessary. In this case, the routine goes from block 708 to block 711, where it is determined if the executed fuel enrichment correction amount FOTP is larger than zero. Thus, the correction amount FOTP is an actual enrichment correction value used when the fuel injection amount to be actually injected is calculated at the preceding timing for attaining the routine of FIG. 5. A "Yes" result is obtained when a fuel enrichment is not effected at a preceding cycle (see block 709). In this case, the routine goes to block 712, where a delay time COTDLY is calculated from a map. This delay is provided for delaying the fuel enrichment after the engine has entered into the area where the air-fuel ratio is to be enriched. The RAM 109 is provided with a map of data of values of COTDLY with respect to the value of the total enrichment correction value as calculated, fFOTP. A map interpolation is carried out to obtain a value of COTDLY corresponding to a value of the enrichment correction value fFOTP. Then the program goes to block 713, where it is determined if the actual delay time CFOTP is larger than the calculated delay time COTDLY. When the calculated delay time has not yet lapsed, i.e., CFOTP<COTDLY, then the routine goes to block 714, where it is determined if the ignition timing retard amount ASUM is larger than a predetermined value c. When the ignition retard amount is not larger than c, then the routine goes to block 710 where the executed enrichment correction amount is made zero, an therefore, an enrichment is not carried out.

When the delay time has lapsed, the actual delay time CFOTP becomes larger than the calculated delay time COTDLY. Then the routine goes from block 713 to block 715, where a value of the calculated enrichment correction amount is moved to the executed fuel enrichment correction amount FOTP. Therefore, the fuel amount enrichment as calculated is carried out. At the following routine, the value of FOTP is not zero, and thus the routine from block 711 goes directly to block 715, to continue the fuel enrichment so long as the value of fFOTP is larger than zero ("yes" at block 708).

At block 716, the amount of fuel to be finally injected, TAU, is calculated by the following equation.

TAU=tTP×(1+FOTP)×α+β, where α and β are other correction amounts determined by other engine condition parameters, such as degree of throttle opening, engine cooling water temperature, or voltage of battery. At block 717, this value TAU is set to the counter 110, and at the same time the flip-flop circuit 111 is set to commence the fuel injection. When the time corresponding to TAU has lapsed, the counter 110 completes the countdown to provide a reset signal to the flip-flop 111, and thus the fuel injection is stopped.

When ignition timing retard amount ASUM is larger than the threshold value c, the routine goes from block 714 to block 715, where a calculated enrichment value fFOTP is moved to the enrichment value FOTP. This means that, when the engine is under the condition that the ignition timing is largely delayed, the fuel enrichment correction is carried out without delay. This routine prevents the temperature of the exhaust from being greatly increased in a turbo-charged internal combustion engine provided with an ignition retard control anti-knocking system.

Figure 7:
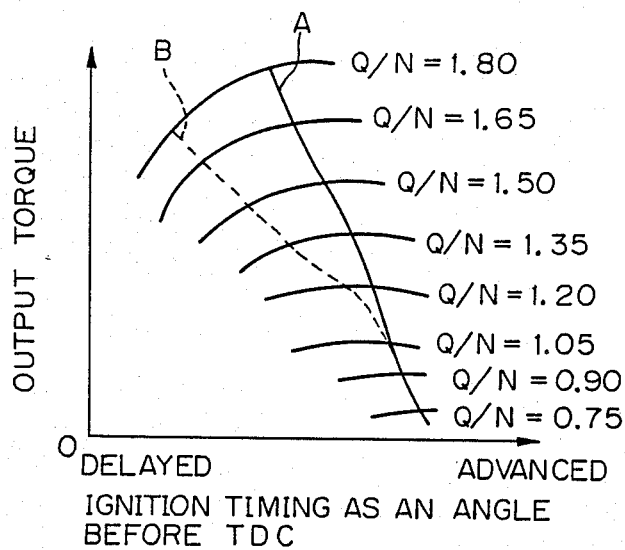
FIG. 7 illustrates relationships between the ignition timing and engine output torque with respect to various values of intake air amount to engine speed ratio as designated.

FIG. 7 shows relationships between ignition timing and engine output power with respect to values of an intake air amount per one rotation, Q/N, as a parameter as designated where the abscissa indicates a spacing of the crank angle at the ignition timing before the top dead center of piston during a compression stroke. As the retard value increases, the ignition timing moves toward TDC. The ignition timing is on a curve A when the engine is a normal type. When the engine is such that it is provided with the above-mentioned ignition retard controlled anti-knocking system and a gasoline having a low octane value is used, the obtained ignition timing is located on a line B which is a delayed ignition timing compared with the normal line A. The low octane value gasoline allows the ignition timing to be further delayed due to the operation of the anti-knocking system for preventing knocking.

Figure 8:
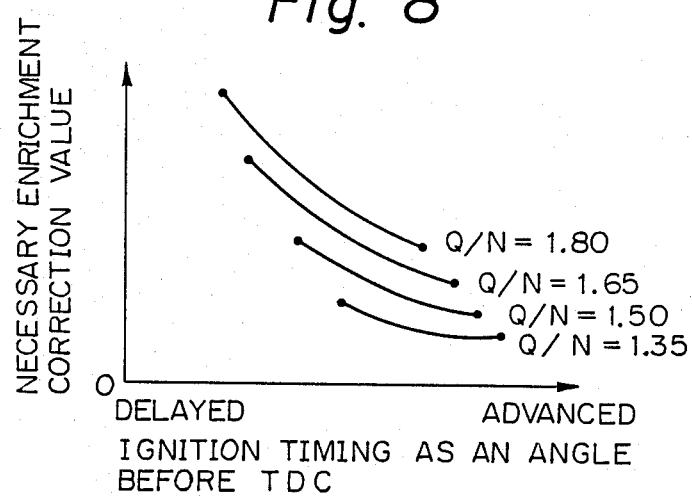
FIG. 8 illustrates relationships between the ignition timing and the fuel enrichment correction value with respect to various values of intake air amount to engine speed ratio as designated.

FIG. 8 shows relationships between the ignition timing and the fuel enrichment correction amount with respect to an intake air amount per one rotation O/N as the designated parameter. The enrichment is, as already explained, determined so as to prevent the temperature of the exhaust gas from being increased. These curves clearly teach that, when the ignition timing is delayed further, the enrichment fuel amount is increased irrespective of the value Q/N. Furthermore, in FIG. 8, as the ignition regard amount increases, the values of inclination of the curves become larger, i.e., the change in fuel enrichment amount increases, so that the increase in the exhaust gas temperature becomes very rapid.

Figure 9A:
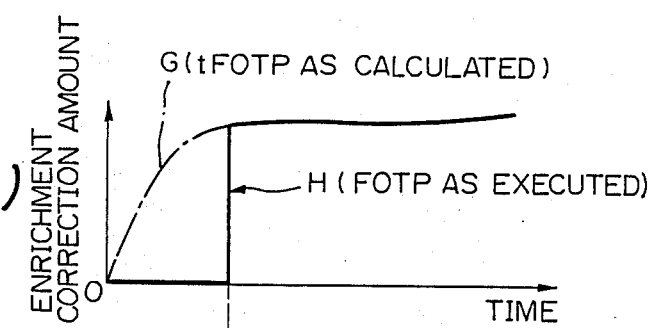
FIGS. 9(a) to 9(d) illustrates, with respect to a lapse of time after the engine has commenced the fuel enrichment correction operation, the fuel enrichment correction value, temperature of the exhaust gas, level of knocking sensor and ignition timing retard correction value, according to the embodiment of the present invention.
Figure 9B:
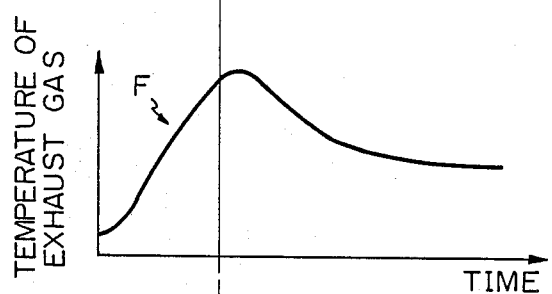
Figure 9C:
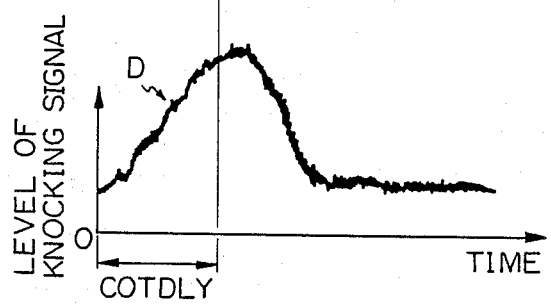
Figure 9D:
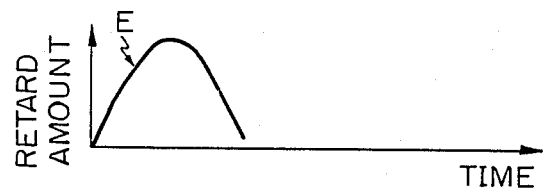

In FIG. 9(c), an increase in the knocking level along the lapse of time is shown by a line D in the prior art engine provided with a turbo-charger and knocking control system. The knocking control system operates to retard the ignition timing as shown by a line E in FIG. 9(d), causing the temperature of the exhaust gas to be greatly increased as shown by a curve F. In this case, the calculated enrichment correction value fFOTP is increased as shown by a curve G. The increase in the actual enrichment correction value FOTP is delayed as shown by a curve H until a predetermined delay time CODTLY has lapsed. Thus, an increase in the exhaust gas temperature is not inevitable.

It will be understood from the above that the employment of the anti-knocking control system in the prior art causes the ignition retard amount to have a large value, resulting in an large increase in the fuel enrichment amount for preventing a large and rapid increase in the temperature of the exhaust gas. The prior art system cannot properly combat damage to the catalytic converter or exhaust line of the engine caused by the increase in the temperature of the exhaust gas, since the prior art system is provided with a time delay system which operates to always delay a fuel enrichment when the engine condition is changed to a state where the fuel enrichment is necessary, from a state in which fuel enrichment is not necessary.

Figure 10A:
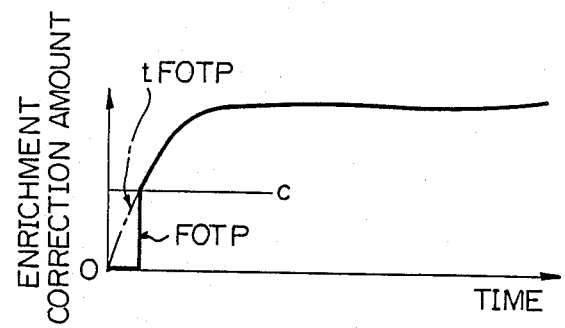
FIGS. 10(a) to 10(d) are the same as FIGS. 9(a) to 9(d), respectively, but of the prior art.
Figure 10B:
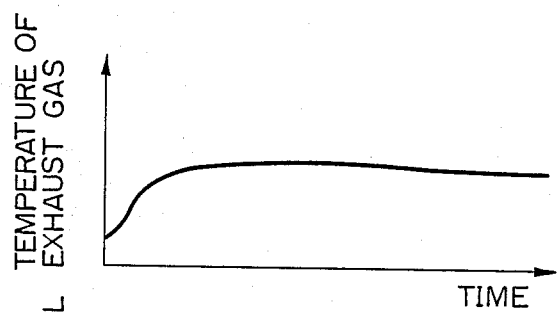
Figure 10C:
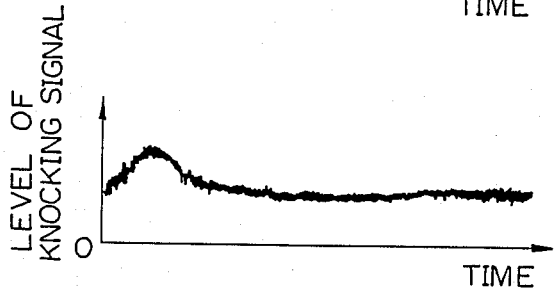
Figure 10D:
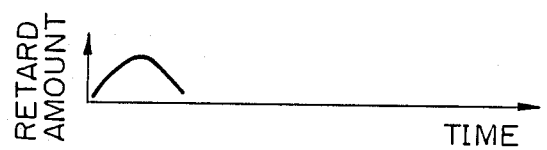

According to the present invention embodied by the first embodiment, the fuel enrichment is carried out without delay under the state that the exhaust gas temperature is apt to be easily increased, i.e., when the ignition retard correction has a value larger than the threshold level c of ASUM (step 714 in FIG. 5). Thus, a quick increase in the fuel injection amount is obtained to prevent any increase in the exhaust gas temperature. In FIG. 10, when the ignition retard value ASUM is larger than the predetermined threshold value c in FIG. 10(d), the value of the calculated enrichment correction value fFOTP is moved to the actual enrichment correction value FOTP, even if the predetermined delay time COTDLY has not yet lapsed. This means that the enrichment delay operation is cancelled. Thus, the increase in the temperature of the exhaust gas is prevented as shown by FIG. 10(b). In addition the knocking level is suppressed as shown in FIG. 10(c).

In the above mentioned first embodiment, it is determined whether or not the total retard amount ASUM is larger than a predetermined value c. In place of this, the knocking retard amount AHOT at block 508 in FIG. 4 can be employed as the threshold value. As will be easily seen from the graph i.e. block 508, the value of AHOT is usually zero and becomes larger than zero at a region where the high engine cooling water THW is high, which region corresponds to a region where the exhaust gas temperature is apt to be increased. It should be noted that the value of AHOT is guarded so that it does not exceed the maximum value by the guard routine at block 506. Thus, the threshold value must be smaller than the guard value.

Figure 11B:
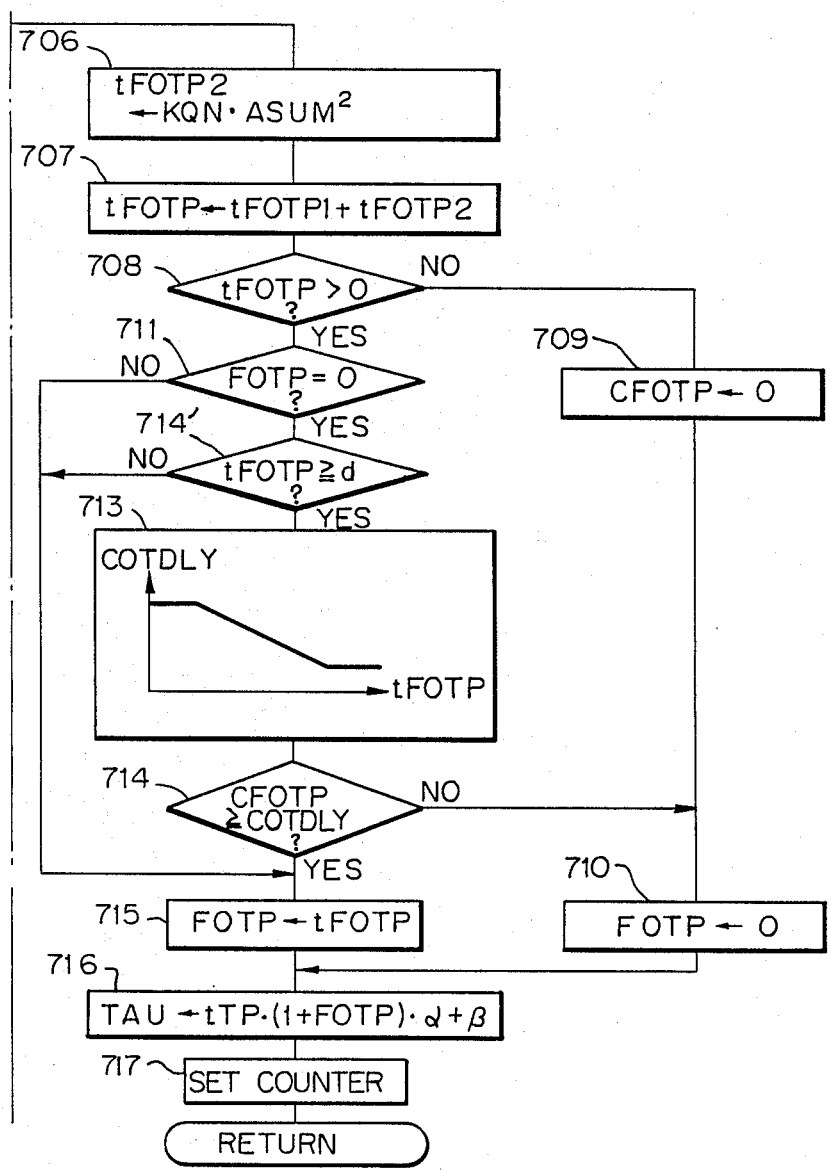

FIG. 11 shows a fuel injection control routine in the second embodiment of the present invention This routine is different from that of the FIG. 5 in that, in place of block 714, a block 714' is provided. At this block, it is determined if the calculated fuel enrichment correction value fFOTP is larger than a predetermined threshold value d. When it is determined that fFOTP is not larger than d, it is considered that the exhaust gas temperature cannot be greatly increased. Then, the routine goes to the blocks following block 712 to attain a delay control of the fuel enrichment correction operation. When it is determined that fFOTP is larger than the threshold value d, then it is considered that an increase in the temperature of the exhaust gas is apt to occur. The routine then goes directly to the block 715, where the calculated enrichment correction value FFOTP is moved to an actual enrichment correction value FOTP. This means that fuel enrichment delay operation is cancelled.

Figure 12A:
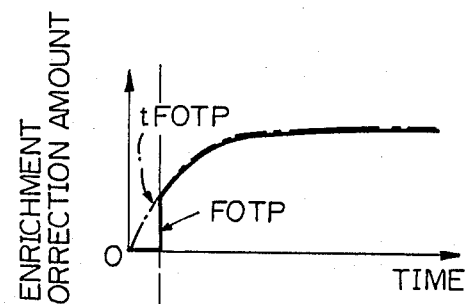
FIGS. 12(a) to 12(d) are the same as FIGS. 9(a) to (d) but of the second embodiment of the present invention.
Figure 12B:
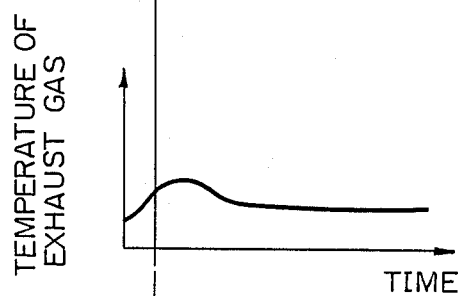
Figure 12C:
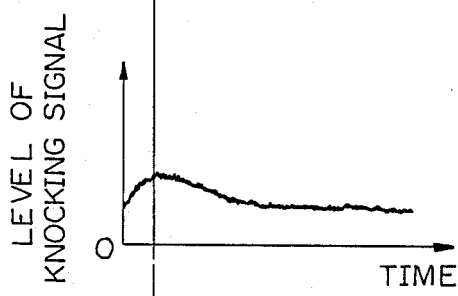
Figure 12D:
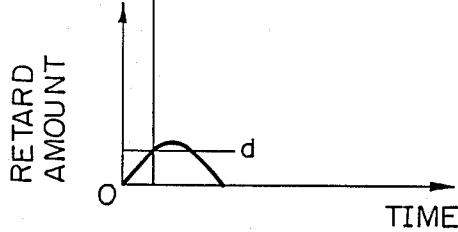

In FIG. 12(a), when the calculated fuel enrichment correction value fFOTP is larger than the predetermined value d, this value is moved to the actual enrichment correction value FOTP. This means that enrichment correction is stopped even if the delay time COTDLY has not yet lapsed. Due to the cancellation of the enrichment delay operation, the exhaust gas temperature can be controlled to a desired value.

Although the embodiments as described are directed to an internal combustion engine provided with a turbocharger and an ignition timing retard controlled antiknocking system, the present invention can be equally applied to other types of internal combustion engine to prevent an increase in the temperature of the exhaust gas.

What is claimed:

1. An internal combustion engine comprising:
   an engine body;
   an intake line for introducing air into the engine body;
   an exhaust line for removing exhaust gas from the engine body;
   means for supplying an amount of fuel into the engine so as to provide an air-fuel mixture;
   means for calculating said amount of fuel to be supplied, from the supply means to the engine, which is determined in accordance with basic engine operating conditions including engine speed and load;
   means for modifying said amount of fuel to be supplied by incorporating an enrichment correction value when the engine conditions are such that the temperature of the exhaust gas is increased;
   delay means for delaying said modification for a predetermined period after enrichment is required within a time range where the increase in the temperature of the exhaust gas is small;
   detecting means for issuing a signal indicating of a particular condition of the engine where the temperature of the exhaust gas is greatly increased when the enrichment is delayed, said detecting means including:
      means for setting a threshold value to the enrichment correction value, and
      means for judging if the actual enrichment correction value is larger than the threshold value for issuing said signal indicating the particular condition, and;
   means, responsive to said signal, for cancelling the operation of the delay means when the engine is in said particular condition.

2. An internal combustion engine according to claim 1, wherein said delay means comprising a timer means for detecting a lapse of time after the engine requires a fuel enrichment, means for calculating a threshold value of a lapse of time i.e. accordance with the value of the enrichment correction and means for judging if the lapse of time is larger than the threshold value so as to issue a signal indicating that the delay time has lapsed, to allow the fuel enrichment.

3. An internal combustion engine according to claim 1, wherein said modifying means comprise means for detecting an engine speed, means for detecting an engine load, first correction means for calculating a correction amount in accordance with the engine speed and second correction means for calculating a correction amount in accordance with the engine load.

4. An internal combustion engine comprising:
   an engine body;
   an intake line for introducing air into the engine body;
   an exhaust line for removing exhaust gas from the engine body;
   means for supplying an amount of fuel into the engine so as to provide an air-fuel mixture;
   means for calculating said amount of fuel to be supplied, from the supply means to the engine, which is determined in accordance with basic engine operation conditions including engine speed and load;
   means for modifying said amount of fuel to be supplied by incorporating an enrichment correction value when the engine conditions are such that the temperature of the exhaust gas is increased;
   delay means for delaying said modification for a predetermined period after enrichment is required within a time range where the increase in the temperature of the exhaust gas is small;
   detecting means for issuing a signal indicating of a particular condition of the engine where the temperature of the exhaust gas is greatly increased when the enrichment is delayed, said detecting means including:
      means for setting a threshold value to the enrichment correction value, and
      means for judging if the actual enrichment correction value is larger than the threshold value for issuing said signal indicating the particular condition,
   means, responsive to said signal, for cancelling the operation of the delay means when the engine is in said particular conditions; and
   a system for retarding an ignition timing in order to control an engine operation condition.

5. An internal combustion engine according to claim 4, wherein said system comprises sensor means for detecting a generation of a knocking and means for retarding the ignition timing in accordance with a knocking level detected by the sensor means.

6. An internal combustion engine according to claim 4, wherein said system comprise sensor means for detecting a temperature of the engine and means for retarding the ignition timing in accordance with the temperature of the engine.

7. An internal combustion engine comprising:
an engine body;
an intake line for introducing air into the engine body;
an exhaust line for removing exhaust gas from the engine body;
turbo-charger means for receiving the energy of the exhaust gas for increasing the intake air pressure in the intake line;
sensor means for providing a signal indicating knocking condition of the engine;
means for controlling an ignition timing in the engine in accordance with a signal from the sensor means for controlling the occurrence of knocking;
means for supplying an amount of fuel into the engine so as to provide an air-fuel mixture;
means for calculating the basic amount of fuel supplied, from the supplying means, to the engine, which is determined in accordance with the basic engine operating conditions including engine speed and load;
means for modifying the basic amount by incorporating an enrichment correction value of the basic amount when the engine conditions are such that the temperature of the exhaust gas is increased;
delay means for delaying said modification for a predetermined period after the enrichment is required within a time range where the increase in the temperature of the exhaust gas is small;
means for setting a threshold value to the enrichment correction value;
means for issuing a signal when the actual ignition timing retard correction value is larger than the threshold value, and;
means for cancelling the operation of the delay means when said signal is issued.

8. An internal combustion engine comprising:
an engine body;
an intake line for introducing air into the engine body;
an exhaust line for removing exhaust gas from the engine body;
turbo-charger means for receiving the energy of the exhaust gas for increasing the intake air pressure in the intake line;
sensor means for providing a signal indicating a knocking condition of the engine;
means for controlling an ignition timing in the engine in accordance with a signal from the sensor means for controlling the occurrence of the knocking;
means for supplying an amount of fuel into the engine so as to provide an air-fuel mixture;
means for calculating the basic amount of fuel supplied, from the supplying means to the engine, which is determined in accordance with the basic engine operating conditions including engine speed and load;
means for modifying the basic amount by incorporating an enrichment correction value of the basic amount when the engine conditions are such that the temperature of the exhaust gas is increased;
delay means for delaying said modification for a predetermined period after the enrichment is required within a time range that the increase in the temperature of the exhaust gas is small;
means for setting a threshold value to the ignition retard value;
means for issuing a signal when the actual enrichment correction value is larger than the threshold value, and;
means for cancelling the operation of the delay means when said signal is issued.

* * * * *